US008094635B2

(12) United States Patent
Chin et al.

(10) Patent No.: US 8,094,635 B2
(45) Date of Patent: Jan. 10, 2012

(54) METHOD AND APPARATUS FOR IMPLEMENTING SHORT MESSAGE SERVICE IN WIRELESS COMMUNICATION NETWORKS

(75) Inventors: Tom Chin, San Diego, CA (US); Kuo-Chun Lee, San Diego, CA (US); Guangming Carl Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 580 days.

(21) Appl. No.: 12/211,920

(22) Filed: Sep. 17, 2008

(65) Prior Publication Data

US 2010/0069097 A1      Mar. 18, 2010

(51) Int. Cl.
*H04W 4/00* (2009.01)
(52) U.S. Cl. .......... 370/338; 455/466
(58) Field of Classification Search .......... 370/338; 455/466
See application file for complete search history.

(56) References Cited

U.S. PATENT DOCUMENTS

| 2005/0250474 | A1 | 11/2005 | Hong et al. |
| 2008/0031128 | A1* | 2/2008 | Jang et al. ............ 370/210 |
| 2009/0061916 | A1* | 3/2009 | Kim et al. ............ 455/466 |
| 2009/0285186 | A1* | 11/2009 | Chin et al. ............ 370/335 |

FOREIGN PATENT DOCUMENTS

| EP | 1906688 A2 | 4/2008 |
| KR | 2006040541 A * | 5/2006 |
| WO | WO2005086379 | 9/2005 |

OTHER PUBLICATIONS

Chang H.S et al., KR 2006040541 (May 10, 2006) English Language.*
International Search Report & Written Opinion—PCT/US2009/056821, International Search Authority—European Patent Office—Jan. 26, 2010.

* cited by examiner

*Primary Examiner* — Marivelisse Santiago Cordero
(74) *Attorney, Agent, or Firm* — Milan Patel

(57) ABSTRACT

A method for implementing Short Message Service (SMS) in a wireless communication network may be implemented by a mobile station. The method may include sending mobile-originated SMS data while in idle mode. Ranging procedures may be used to send the mobile-originated SMS data. The method may also include receiving mobile-terminated SMS data while in the idle mode. Receiving the mobile-terminated SMS data may include receiving a broadcast page message from a base station, and the broadcast page message may include an identifier for the mobile station.

28 Claims, 15 Drawing Sheets

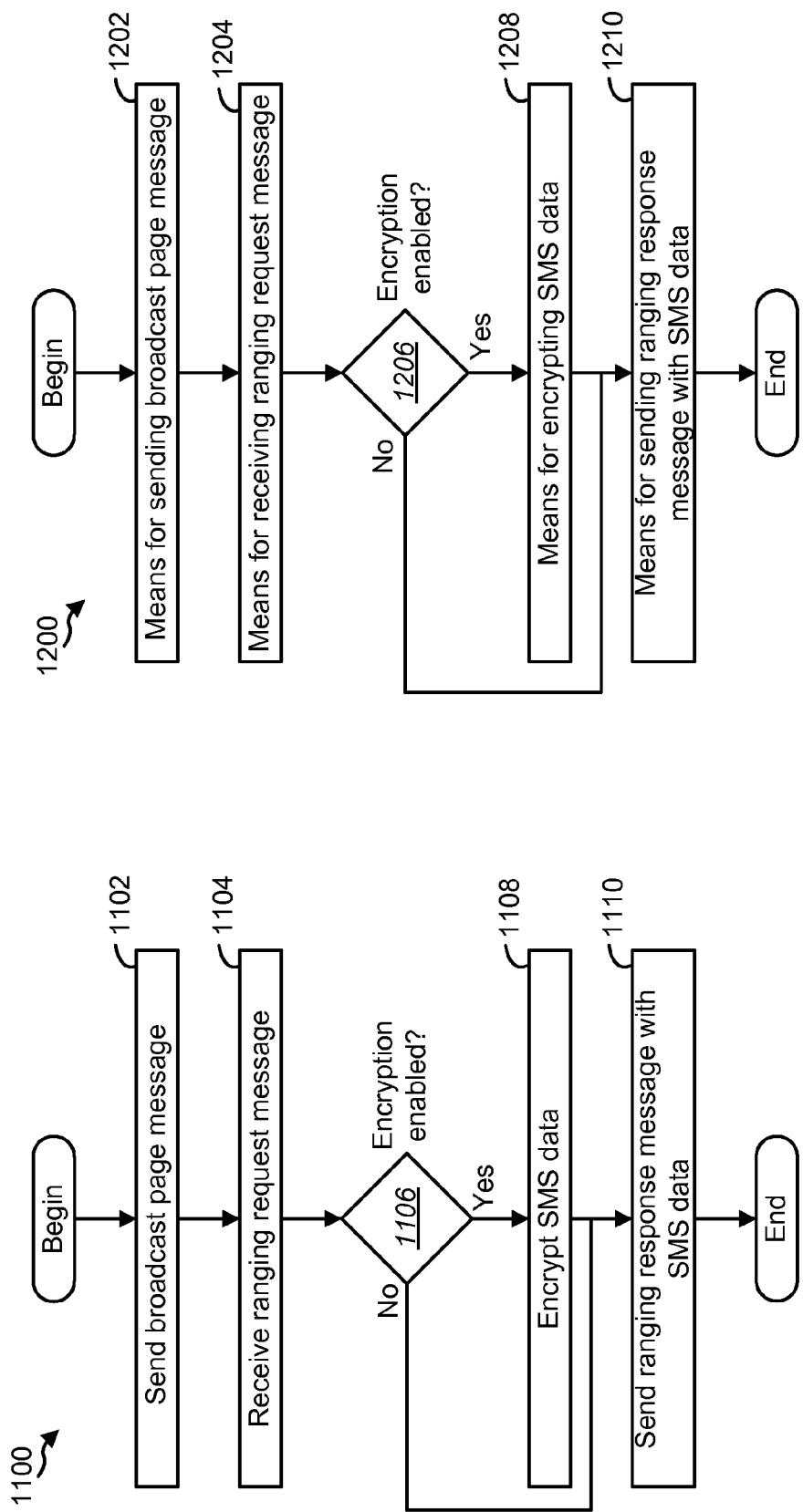

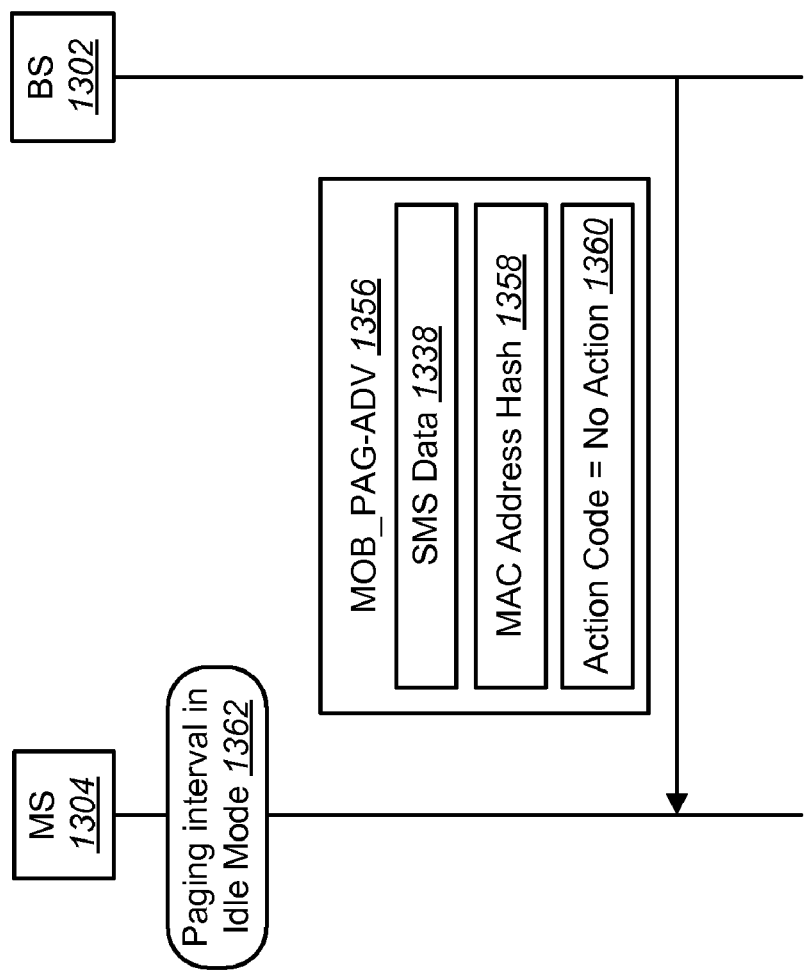

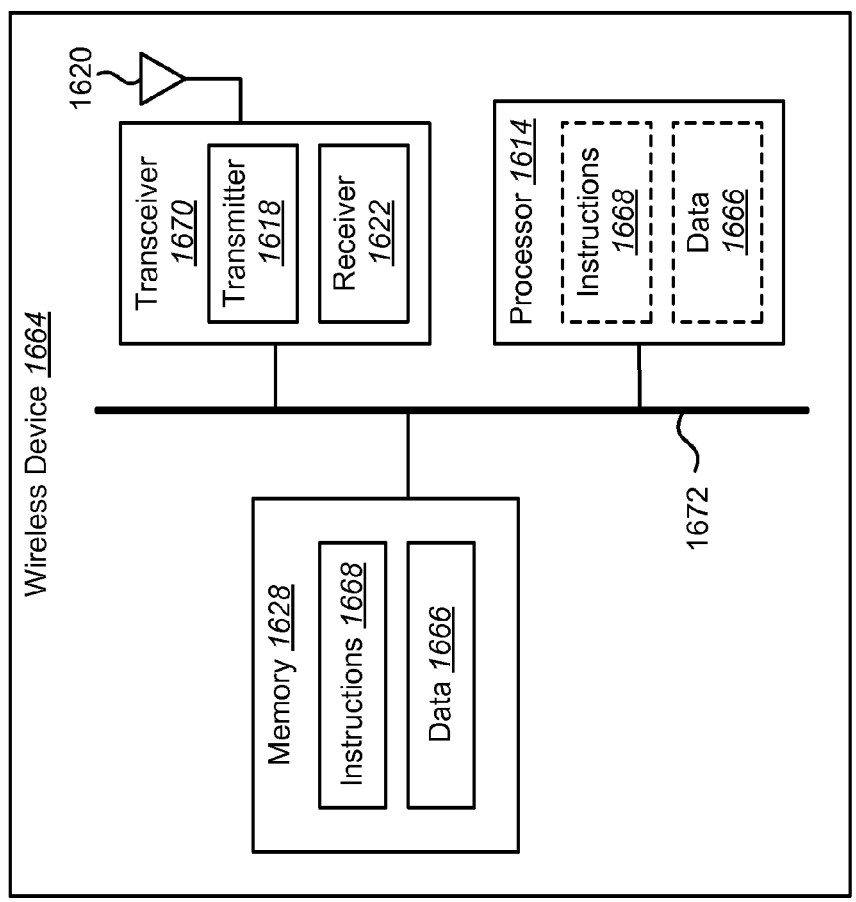

METHOD AND APPARATUS FOR IMPLEMENTING SHORT MESSAGE SERVICE IN WIRELESS COMMUNICATION NETWORKS

TECHNICAL FIELD

The present disclosure relates generally to communication systems. More specifically, the present disclosure relates to methods and apparatus for implementing short message service in wireless communication networks.

BACKGROUND

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication network (e.g., bandwidth and transmit power) may be shared among multiple mobile stations. A variety of multiple access techniques are known, including code division multiple access (CDMA), time division multiple access (TDMA), frequency division multiple access (FDMA), and orthogonal frequency division multiple access (OFDMA).

Benefits may be realized by improved methods and apparatus related to the operation of wireless communication networks.

BRIEF DESCRIPTION OF THE DRAWINGS

FIG. 11 illustrates an example of a method for sending mobile-terminated SMS data in accordance with the present disclosure;

FIG. 12 illustrates means-plus-function blocks corresponding to the method of FIG. 11;

FIG. 13 illustrates an example showing another way that a mobile station may receive mobile-terminated SMS data in accordance with the present disclosure;

FIG. 16 illustrates certain components that may be included within a wireless device that is configured in accordance with the present disclosure.

SUMMARY

Figure 1:
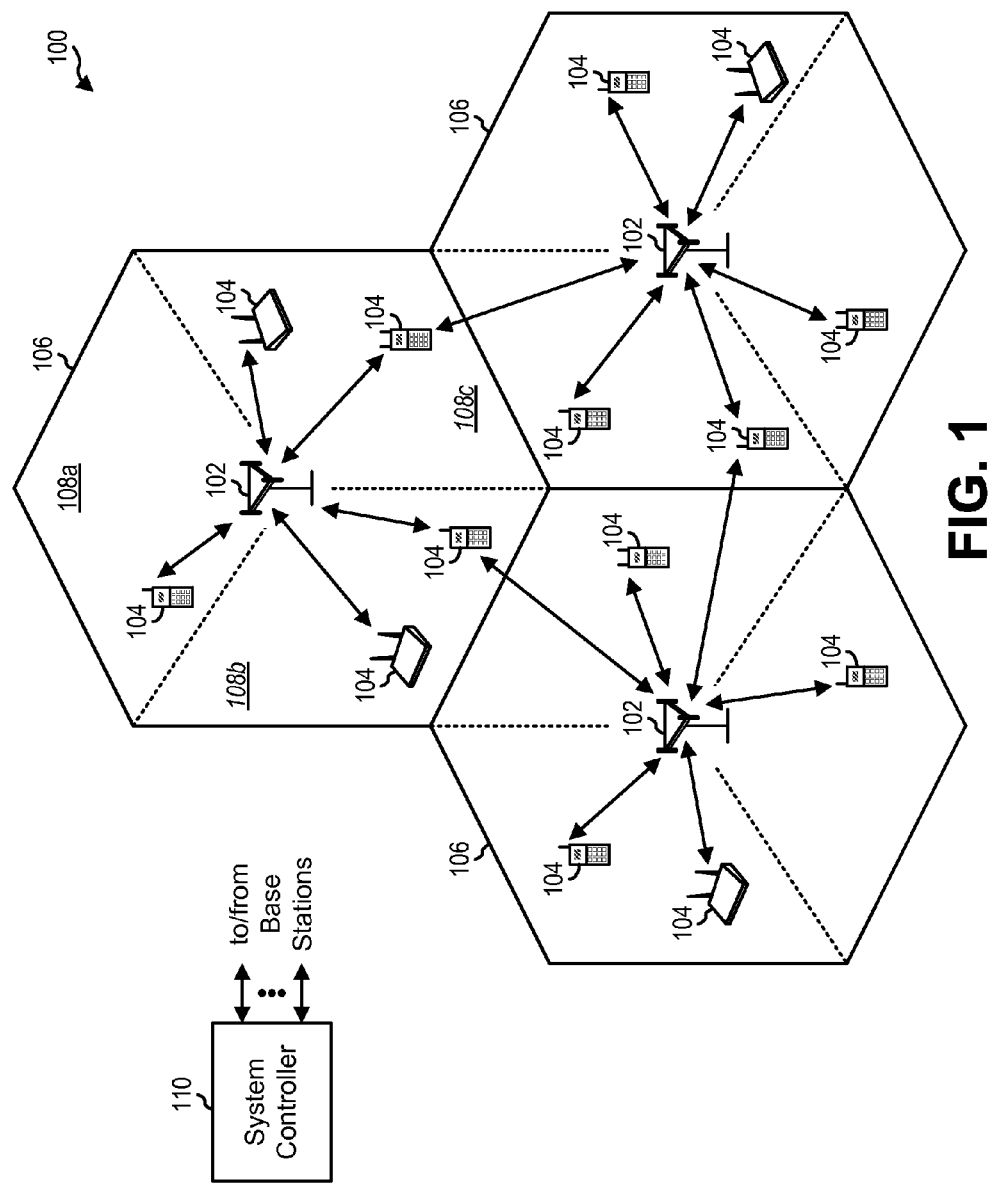
FIG. 1 illustrates a wireless communication system with multiple base stations and multiple mobile stations.

A method for implementing Short Message Service (SMS) in a wireless communication network is disclosed. The method may be implemented by a mobile station. The method may include sending mobile-originated SMS data while in idle mode. Ranging procedures may be used to send the mobile-originated SMS data. The method may also include receiving mobile-terminated SMS data while in the idle mode. Receiving the mobile-terminated SMS data may include receiving a broadcast page message from a base station. The broadcast page message may include an identifier for the mobile station.

A mobile station configured for implementing Short Message Service (SMS) in a wireless communication network is disclosed. The mobile station may include a processor. The mobile station may also include memory in electronic communication with the processor. The mobile station may also include instructions stored in the memory. The instructions may be executable by the processor to send mobile-originated SMS data while in idle mode. Ranging procedures may be used to send the mobile-originated SMS data. The instructions may also be executable to receive mobile-terminated SMS data while in the idle mode. Receiving the mobile-terminated SMS data may include receiving a broadcast page message from a base station. The broadcast page message may include an identifier for the mobile station.

A mobile station configured for implementing Short Message Service (SMS) in a wireless communication network is disclosed. The mobile station may include means for sending mobile-originated SMS data while in idle mode. Ranging procedures may be used to send the mobile-originated SMS data. The mobile station may also include means for receiving mobile-terminated SMS data while in the idle mode. Receiving the mobile-terminated SMS data may include receiving a broadcast page message from a base station. The broadcast page message may include an identifier for the mobile station.

A computer-program product for a mobile station to implement Short Message Service (SMS) in a wireless communication network is disclosed. The computer-program product may include a computer-readable medium having instructions thereon. The instructions may include code for sending mobile-originated SMS data while in idle mode. Ranging procedures may be used to send the mobile-originated SMS data. The instructions may also include code for receiving mobile-terminated SMS data while in the idle mode. Receiving the mobile-terminated SMS data may include receiving a broadcast page message from a base station. The broadcast page message may include an identifier for the mobile station.

A method for implementing Short Message Service (SMS) in a wireless communication network is disclosed. The method may be implemented by a base station. The method may include receiving mobile-originated SMS data from a mobile station while the mobile station is in idle mode. Ranging procedures may be used to receive the mobile-originated SMS data. The method may also include sending mobile-terminated SMS data to the mobile station while the mobile station is in the idle mode. Sending the mobile-terminated SMS data may include sending a broadcast page message. The broadcast page message may include an identifier for the mobile station.

A base station configured for implementing Short Message Service (SMS) in a wireless communication network is disclosed. The base station may include a processor. The base station may also include memory in electronic communication with the processor. The base station may also include instructions stored in the memory. The instructions may be executable by the processor to receive mobile-originated SMS data from a mobile station while the mobile station is in idle mode. Ranging procedures may be used to receive the mobile-originated SMS data. The instructions may also be executable to send mobile-terminated SMS data to the mobile station while the mobile station is in the idle mode. Sending the mobile-terminated SMS data may include sending a broadcast page message. The broadcast page message may include an identifier for the mobile station.

A base station configured for implementing Short Message Service (SMS) in a wireless communication network is disclosed. The base station may include means for receiving mobile-originated SMS data from a mobile station while the mobile station is in idle mode. Ranging procedures may be used to receive the mobile-originated SMS data. The base station may also include means for sending mobile-terminated SMS data to the mobile station while the mobile station is in the idle mode. Sending the mobile-terminated SMS data may include sending a broadcast page message. The broadcast page message may include an identifier for the mobile station.

A computer-program product for a base station to implement Short Message Service (SMS) in a wireless communication network is disclosed. The computer-program product may include a computer-readable medium having instructions thereon. The instructions may include code for receiving mobile-originated SMS data from a mobile station while the mobile station is in idle mode. Ranging procedures may be used to receive the mobile-originated SMS data. The instructions may also include code for sending mobile-terminated SMS data to the mobile station while the mobile station is in the idle mode. Sending the mobile-terminated SMS data may include sending a broadcast page message. The broadcast page message may include an identifier for the mobile station.

DETAILED DESCRIPTION

FIG. 1 shows a wireless communication system 100 with multiple base stations (BS) 102 and multiple mobile stations (MS) 104. A base station 102 is a station that communicates with the mobile stations 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may also be called, and may contain some or all of the functionality of, a terminal, an access terminal, a user equipment, a subscriber unit, a station, etc. A mobile station 104 may be a cellular phone, a personal digital assistant (PDA), a wireless device, a wireless modem, a handheld device, a laptop computer, etc. A mobile station 104 may communicate with zero, one, or multiple base stations 104 on the downlink (DL) and/or uplink (UL) at any given moment. The downlink (or forward link) refers to the communication link from the base stations 102 to the mobile stations 104, and the uplink (or reverse link) refers to the communication link from the mobile stations 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another.

Figure 2:
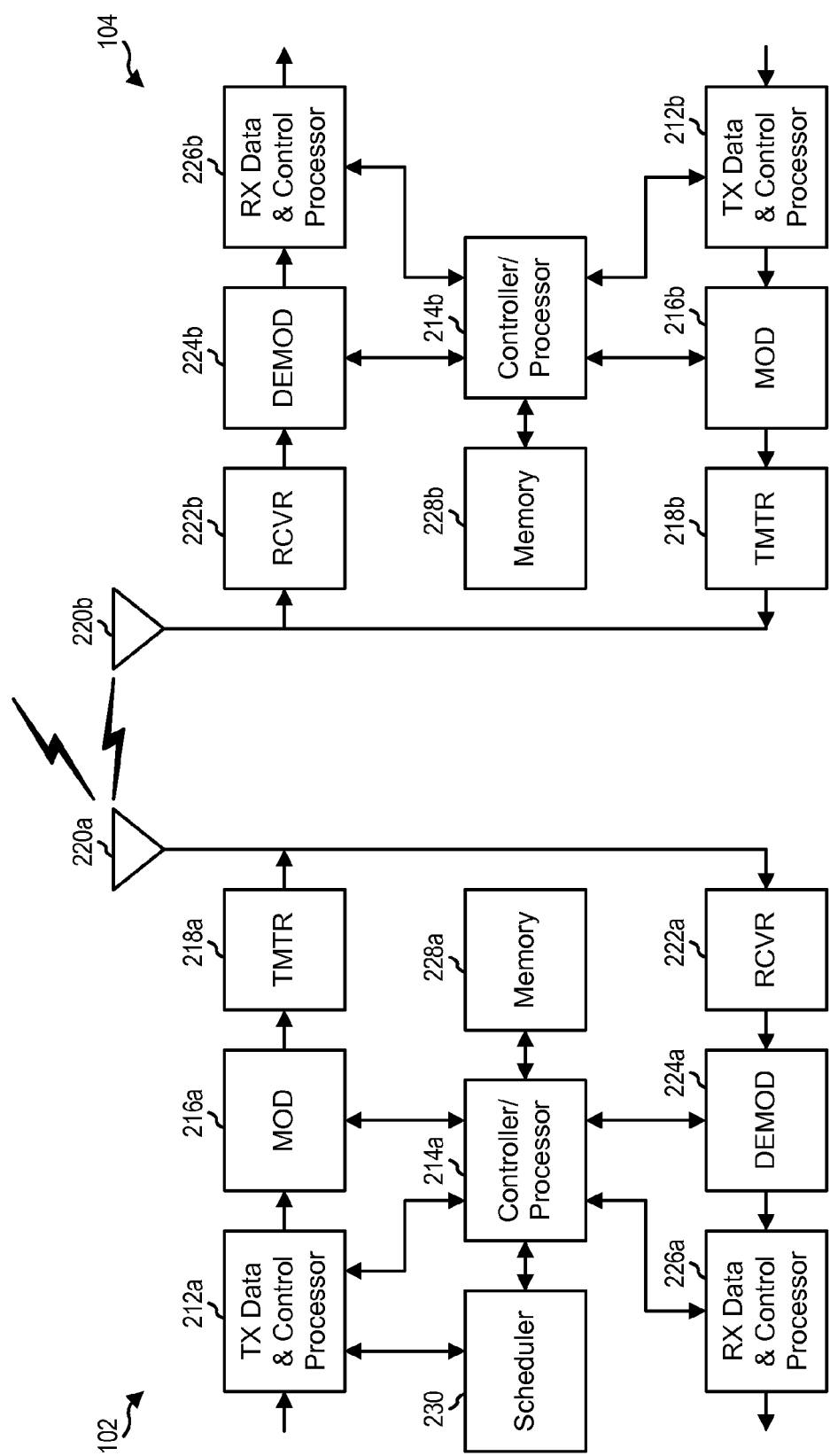
FIG. 2 illustrates a block diagram of a design of a base station and a mobile station.

FIG. 2 shows a block diagram of a design of a base station 102 and a mobile station 104, which may be one of the base stations 102 and one of the mobile stations 104 in FIG. 1. At the base station 102, a transmit (TX) data and control processor 212a may receive traffic data from a data source (not shown) and/or control information from a controller/processor 214a. The processor 212a may process (e.g., format, encode, interleave, and symbol map) the traffic data and control information and provide modulation symbols. A modulator (MOD) 216a may process the modulation symbols (e.g., for OFDM) and provide output chips. A transmitter (TMTR) 218a may process (e.g., convert to analog, amplify, filter, and upconvert) the output chips and generate a downlink signal, which may be transmitted via an antenna 220a.

At the mobile station 104, an antenna 220b may receive the downlink signals from the base station 102 and other base stations 102 and may provide a received signal to a receiver (RCVR) 222b. The receiver 222b may condition (e.g., filter, amplify, downconvert, and digitize) the received signal and provide received samples. A demodulator (DEMOD) 224b may process the received samples (e.g., for OFDM) and provide demodulated symbols. A receive (RX) data and control processor 226b may process (e.g., symbol demap, deinterleave, and decode) the demodulated symbols to obtain decoded data and control information for the mobile station 104.

On the uplink, at the mobile station 104, data and control information to be sent by the mobile station 104 may be processed by a TX data and control processor 212b, modulated by a modulator 216b, conditioned by a transmitter 218b, and transmitted via an antenna 220b. At the base station 102, the uplink signals from the mobile station 104 and possibly other mobile stations 104 may be received by an antenna 220a, conditioned by a receiver 222a, demodulated by a demodulator 224a, and processed by an RX data and control processor 226a to recover the data and control information sent by the mobile station 104. The processing for uplink transmission may be similar to or different from the processing for downlink transmission.

Controllers/processors 214a and 214b may direct the operation at the base station 102 and the mobile station 104, respectively. Memories 228a and 228b may store data and program codes for the base station 102 and the mobile station 104, respectively. A scheduler 230 may schedule mobile stations 104 for downlink and/or uplink transmission and may provide assignments of system resources.

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called Wireless MAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. These examples should not be interpreted as limiting the scope of the present disclosure.

The present disclosure relates to techniques for a mobile station to send and receive Short Message Service (SMS) data in wireless communication networks. SMS is a communications protocol allowing the interchange of short text messages between mobile stations. SMS technology has facilitated the development and growth of text messaging. However, current WiMAX standards do not indicate how SMS may be implemented in a WiMAX network.

In accordance with current WiMAX standards, before a mobile station that is in the idle mode (i.e., a mobile station that does not currently have any traffic connections) can transmit any data packets, the mobile station exits the idle mode and establishes a new traffic connection. However, establishing a traffic connection for sending a small amount of data can waste the processing and bandwidth of various network entities.

In accordance with the present disclosure, a mobile station may send and receive SMS data while in idle mode, without establishing a traffic connection. As will be described in greater detail below, ranging procedures may be utilized in order to allow mobile stations to send SMS data. Broadcast page messages may be utilized in order to allow mobile stations to receive SMS data. As used herein, the term "mobile-originated SMS data" refers to SMS data that a mobile station sends. The term "mobile-terminated SMS data" refers to SMS data that a mobile station receives.

Figure 3:
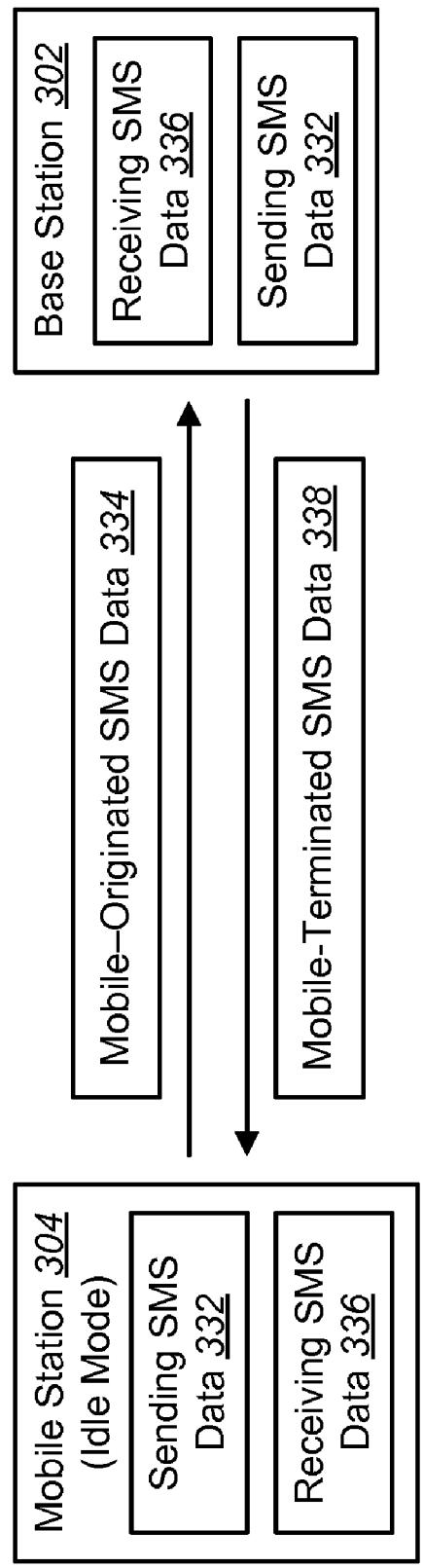
FIG. 3 illustrates an example of a mobile station and a base station that are configured to implement short message service (SMS) in accordance with the present disclosure.

Reference is now made to FIG. 3. FIG. 3 illustrates an example of a mobile station 304 and a base station 302 that are configured to implement SMS in accordance with the present disclosure.

The mobile station 304 may include one or more components 332 for sending mobile-originated SMS data 334 while in idle mode. An example showing one way that ranging procedures may be used to send the mobile-originated SMS data 334 will be described below.

The mobile station 304 may send mobile-originated SMS data 334 to a base station 302. Thus, the base station 302 may include one or more components 336 for receiving mobile-originated SMS data 334 from a mobile station 304 while the mobile station 304 is in idle mode.

The mobile station 304 may also include one or more components 336 for receiving mobile-terminated SMS data 338 while in idle mode. Two examples of ways to receive mobile-terminated SMS data 338 will be described below. Both examples involve the use of broadcast page messages.

The mobile station 304 may receive mobile-terminated SMS data 338 from a base station 302. Thus, the base station 302 may include one or more components 332 for sending mobile-terminated SMS data 338 to a mobile station 304 while the mobile station 304 is in idle mode.

Figure 4:
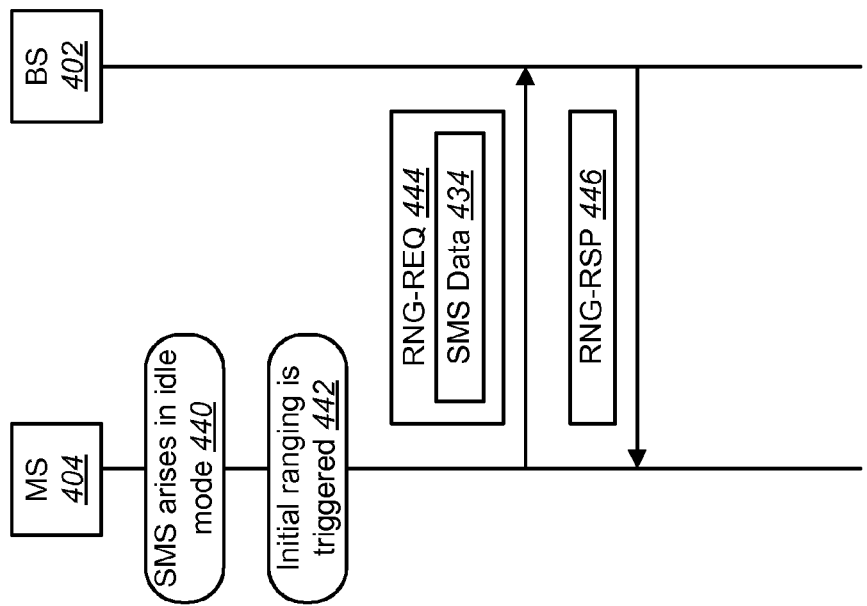
FIG. 4 illustrates an example showing how a mobile station may send mobile-originated SMS data in accordance with the present disclosure.

Reference is now made to FIG. 4. FIG. 4 illustrates an example showing how a mobile station 404 may send mobile-originated SMS data 434 in accordance with the present disclosure.

Mobile-originated SMS data 434 may arise 440 while the mobile station 404 is in idle mode. This may have the effect of triggering 442 the initial ranging procedure that is performed by the mobile station 404. The mobile station 404 may perform the initial ranging procedure while in idle mode. In particular, the mobile station 404 may send a ranging request message (RNG-REQ) 444 to the base station 402. The mobile-originated SMS data 434 may be included as a parameter in the ranging request message 444. When the base station 402 receives the ranging request message 444, the base station 402 may reply with a ranging response message (RNG-RSP) 446.

In accordance with another aspect of the present disclosure, the mobile-originated SMS data that is included as a parameter in the ranging request message may be encrypted. Whether the mobile-originated SMS data is encrypted or not encrypted may be negotiated in accordance with Subscriber Basic Capability (SBC) negotiation procedures. Additionally, the encryption algorithm that is used may be negotiated using SBC negotiation procedures.

Figure 5:
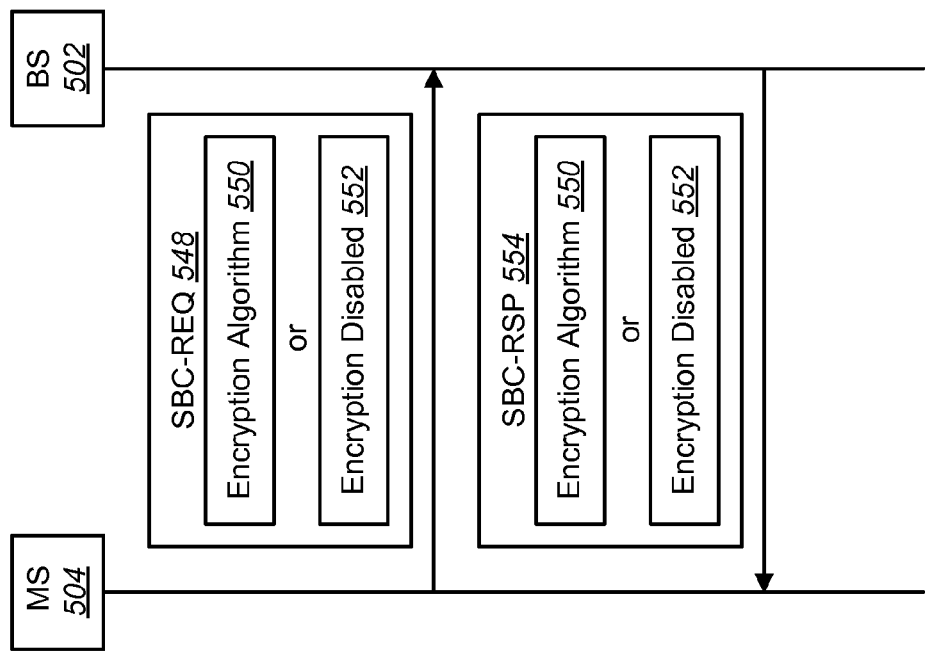
FIG. 5 illustrates an example showing how a mobile station and a base station may negotiate about encryption for SMS data in accordance with the present disclosure.

Reference is now made to FIG. 5. FIG. 5 illustrates an example showing how a mobile station 504 and a base station 502 may negotiate about encryption for SMS data (either mobile-originated SMS data or mobile-terminated SMS data) in accordance with the present disclosure. As shown, a mobile station 504 may send an SBC request message (SBC-REQ) 548 to a base station 502. The SBC request message 548 may specify an SMS encryption algorithm 550 to be used. Alternatively, the SBC request message 548 may include a request 552 that encryption be disabled. The base station 502 may respond to the SBC request message 548 by sending an SBC response message (SBC-RSP) 554 to the mobile station 504. The SBC response message 554 may similarly specify an SMS encryption algorithm 550 to be used or include a request 552 that encryption be disabled.

If the methods for sending and receiving SMS data disclosed herein are implemented in a WiMAX network, the key that is used for encryption/decryption may be the same message authentication key that is specified in WiMAX standards. For example, if the CMAC (Cipher MAC) algorithm is used, then the CMAC_KEY_U (Uplink CMAC KEY) and the CMAC_KEY_D (Downlink CMAC KEY) may be used for SMS encryption.

Figure 6:
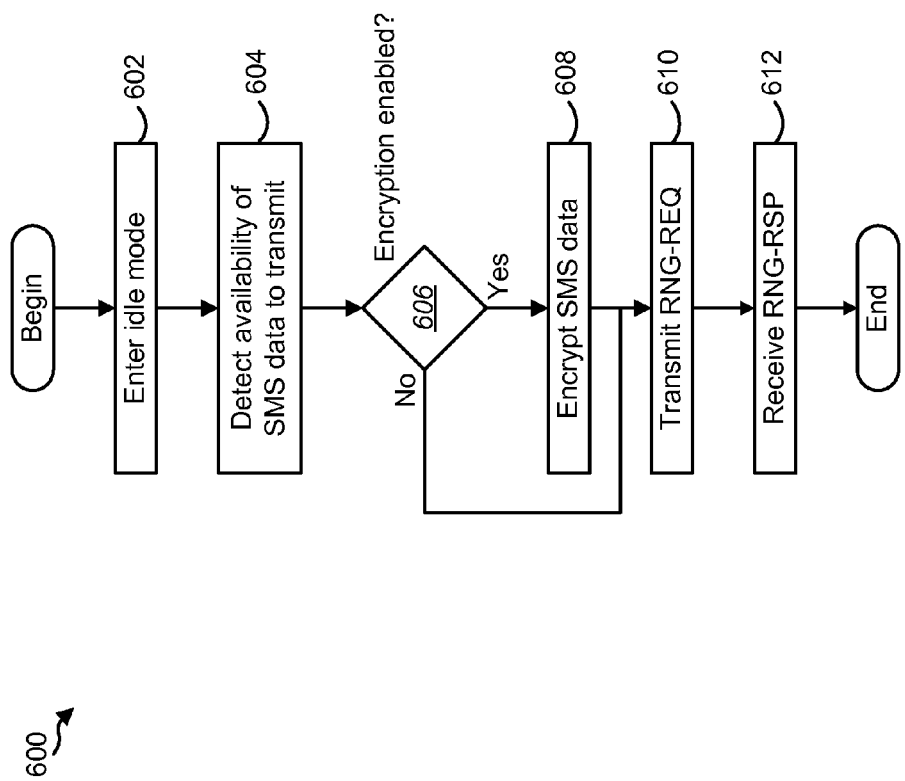
FIG. 6 illustrates an example of a method for sending mobile-originated SMS data in accordance with the present disclosure.

Reference is now made to FIG. 6. FIG. 6 illustrates an example of a method 600 for sending mobile-originated SMS data in accordance with the present disclosure. The method 600 may be implemented by a mobile station while the mobile station is in idle mode.

In accordance with the depicted method 600, the mobile station may enter 602 idle mode. After entering 602 idle mode, the mobile station may detect 604 the availability of mobile-originated SMS data to transmit. This may have the effect of triggering the initial ranging procedure that is performed by the mobile station. The mobile station may determine 606 whether SMS encryption is enabled or not. Whether SMS encryption is enabled may be decided during SBC negotiation procedures, as discussed above. If encryption is enabled, then the mobile station may encrypt 608 the mobile-originated SMS data. The mobile station may then transmit 610 a ranging request message to the base station. The mobile-originated SMS data may be included as a parameter in the ranging request message. The mobile station may also receive 612 a ranging response message from the base station.

Figure 7:
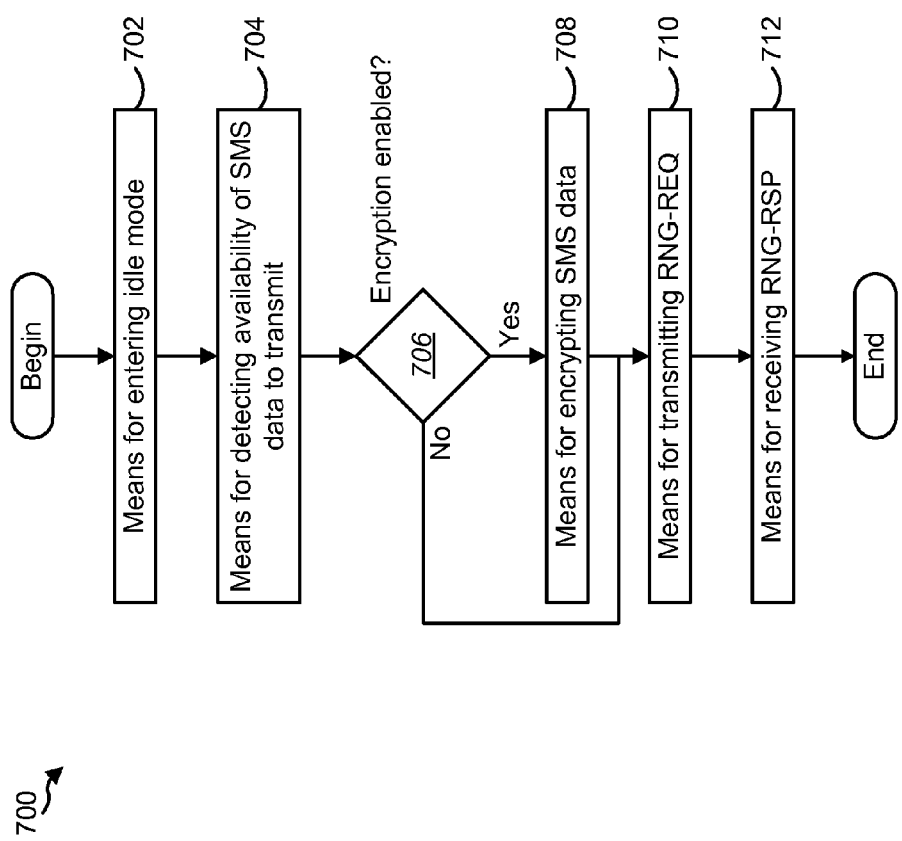
FIG. 7 illustrates means-plus-function blocks corresponding to the method of FIG. 6.

The method 600 of FIG. 6 described above may be performed by various hardware and/or software component(s) and/or module(s) corresponding to the means-plus-function blocks 700 illustrated in FIG. 7. In other words, blocks 602 through 612 illustrated in FIG. 6 correspond to means-plus-function blocks 702 through 712 illustrated in FIG. 7.

As indicated above, another aspect of the present disclosure relates to techniques for a mobile station to receive mobile-terminated SMS data while in idle mode, without establishing a traffic connection. Two different approaches for receiving mobile-terminated SMS data are disclosed herein. Both approaches involve the use of broadcast page messages. In accordance with the first approach, the broadcast page message triggers location update procedures, and the mobile-terminated SMS data is included in a message that the base station sends during the location update procedures. In accordance with the second approach, the mobile-terminated SMS data may be included in the broadcast page message itself.

Figure 8:
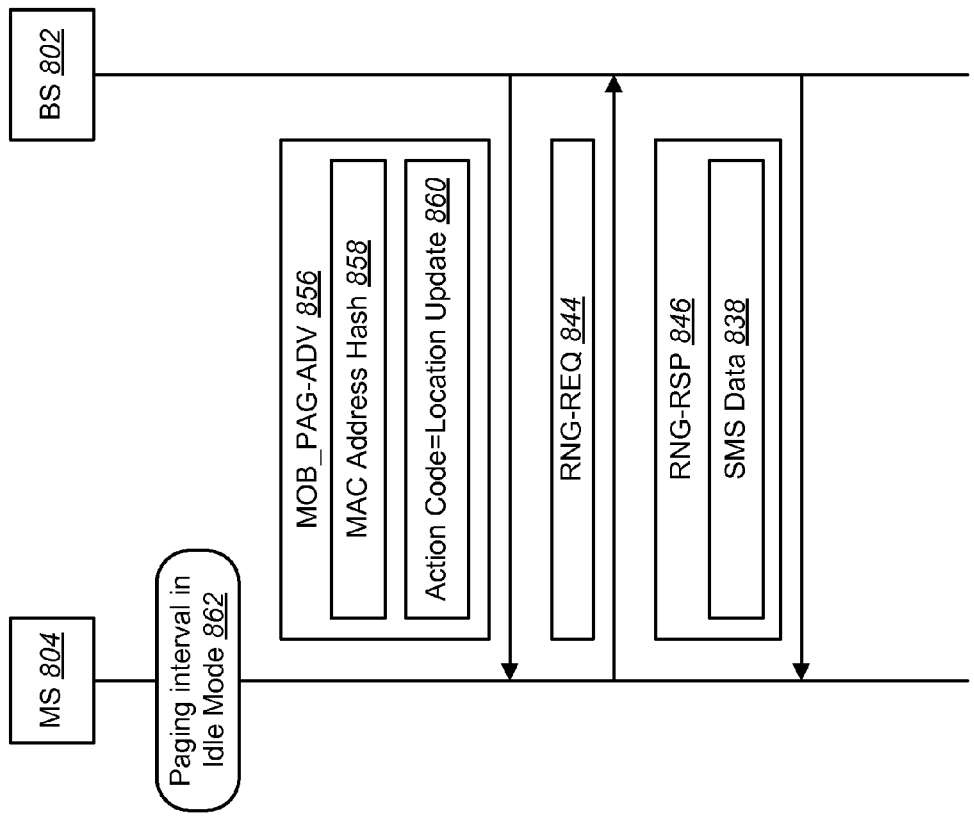
FIG. 8 illustrates an example showing one way that a mobile station may receive mobile-terminated SMS data in accordance with the present disclosure.

Reference is now made to FIG. 8. FIG. 8 illustrates an example showing one way that a mobile station 804 may receive mobile-terminated SMS data 838 in accordance with the present disclosure.

When a wireless communication network receives mobile-terminated SMS data 838, the base station 802 may send a broadcast page message (MOB_PAG-ADV) 856 during a paging interval 862. The broadcast page message 856 may include an identifier for the receiving mobile station 804 (i.e., the mobile station 804 for which the mobile-terminated SMS data 838 is intended). For example, in WiMAX networks, the broadcast page message 856 may include the 24-bit MAC address hash 858 of the receiving mobile station 804.

The broadcast page message 856 may also include a command to perform location update procedures. For example, in WiMAX networks, the broadcast page message may include an action code 860. The value of the action code 860 may be set to "location update."

When the receiving mobile station 804 receives the broadcast page message 856, the mobile station 804 may perform the initial ranging procedure. In particular, the mobile station 804 may send a ranging request message (RNG-REQ) 844 and the base station 802 may reply with a ranging response message (RNG-RSP) 846. The base station 802 may include the mobile-terminated SMS data 838 as a parameter in the ranging response message 846.

The mobile-terminated SMS data 838 that is included as a parameter in the ranging response message 846 may be encrypted. Whether the mobile-terminated SMS data 838 is encrypted or not encrypted may be negotiated in accordance with the Subscriber Basic Capability (SBC) negotiation procedures, as described above. Additionally, the encryption algorithm that is used may be negotiated during the SBC negotiation procedures, as described above.

Figure 9:
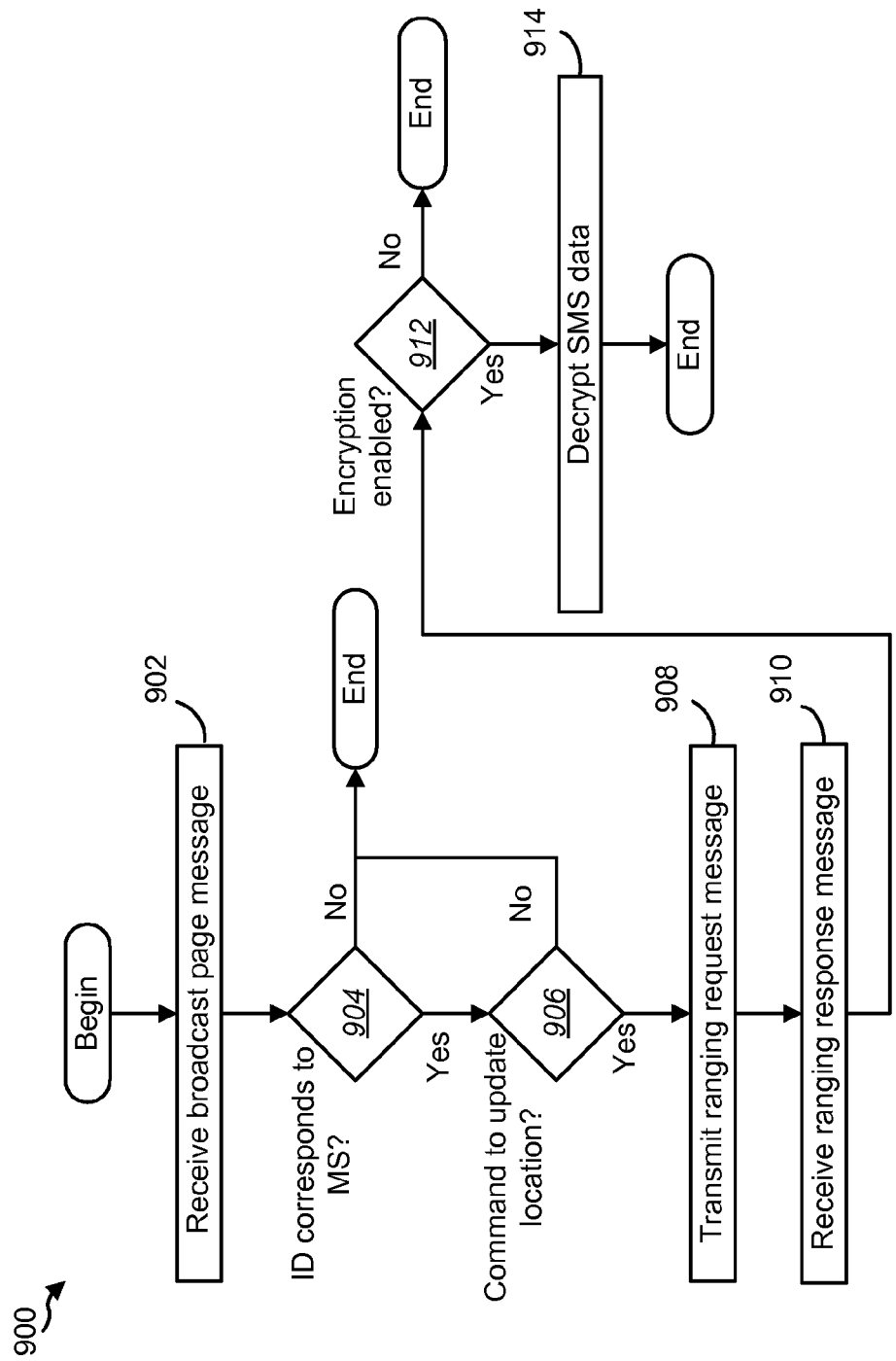
FIG. 9 illustrates an example of a method for receiving mobile-terminated SMS data in accordance with the present disclosure.

Reference is now made to FIG. 9. FIG. 9 illustrates an example of a method 900 for receiving mobile-terminated SMS data in accordance with the present disclosure. The method 900 may be implemented by a mobile station while the mobile station is in idle mode.

In accordance with the depicted method, the mobile station may receive 902 a broadcast page message during a paging interval. The mobile station may determine 904 whether an identifier (e.g., a MAC address hash) in the broadcast page message corresponds to the mobile station. If it does, then the mobile station may determine 906 whether the broadcast page message includes a command to perform location update procedures (e.g., whether the action code is set to "location update"). If so, then the mobile station may transmit 908 a ranging request message to the base station. The mobile station may then receive 910 a ranging response message from the base station. The mobile-terminated SMS data may be included as a parameter in the ranging response message.

The mobile station may determine 912 whether SMS encryption is enabled. Whether SMS encryption is enabled may be decided during SBC negotiation procedures, as discussed above. If SMS encryption is enabled, then the mobile station may decrypt 914 the mobile-terminated SMS data.

Figure 10:
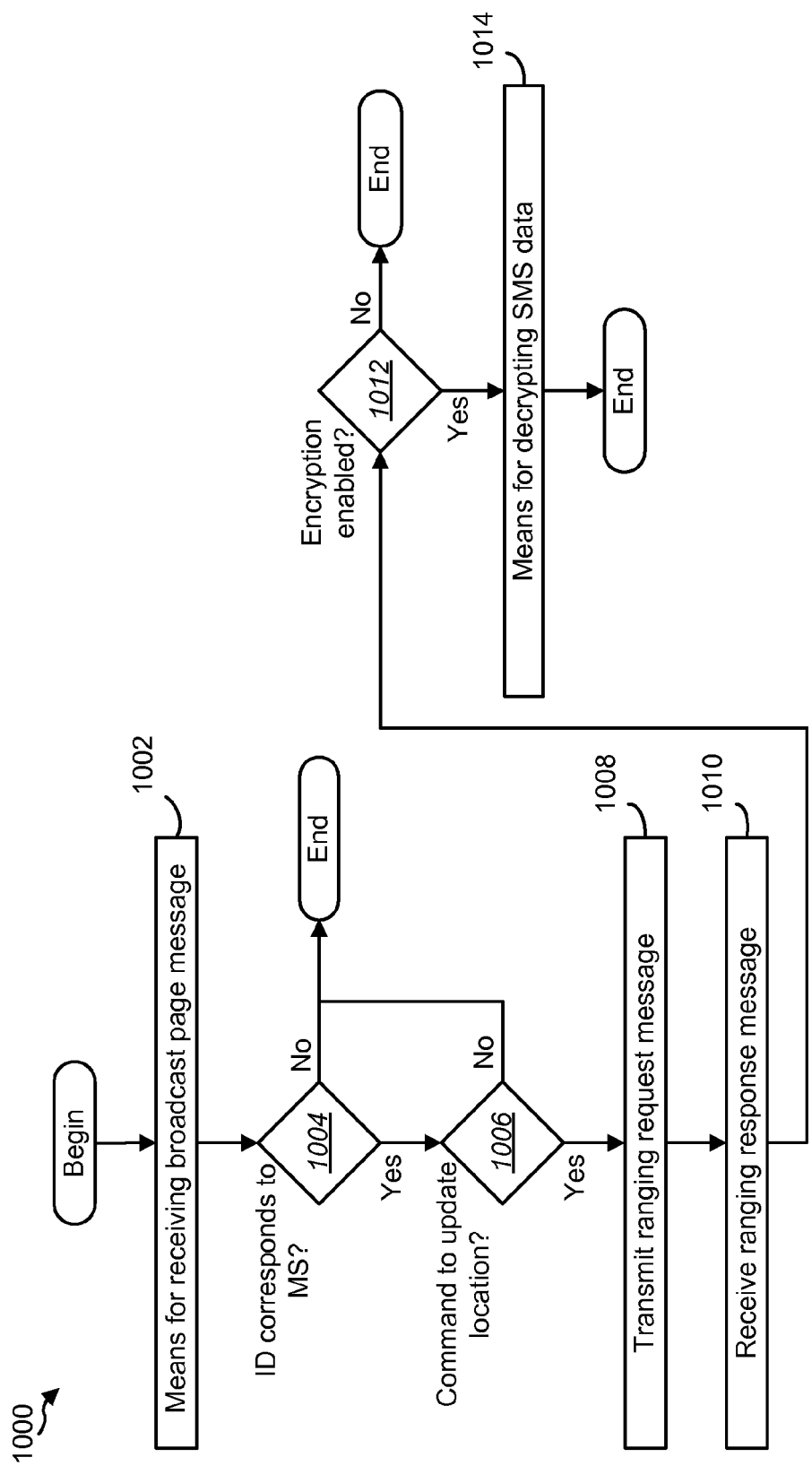
FIG. 10 illustrates means-plus-function blocks corresponding to the method of FIG. 9.

The method 900 of FIG. 9 described above may be performed by various hardware and/or software component(s) and/or module(s) corresponding to the means-plus-function blocks 1000 illustrated in FIG. 10. In other words, blocks 902 through 914 illustrated in FIG. 9 correspond to means-plus-function blocks 1002 through 1014 illustrated in FIG. 10.

Reference is now made to FIG. 11. FIG. 11 illustrates an example of a method 1100 for sending mobile-terminated SMS data in accordance with the present disclosure. The method 1100 may be implemented by a base station.

In accordance with the depicted method 1100, the base station may send 1102 a broadcast page message during a paging interval. The broadcast page message may include an identifier for the receiving mobile station (e.g., the MAC address hash of the receiving mobile station). The broadcast page message may also include a command to perform location update procedures (e.g., the action code may be set to "location update").

In response to receiving the broadcast page message, the mobile station may send a ranging request message. The base station may receive 1104 the ranging request message. The base station may determine 1106 whether SMS encryption is enabled. Whether SMS encryption is enabled may be decided during SBC negotiation procedures, as discussed above. If SMS encryption is enabled, then the base station may encrypt 1108 the mobile-terminated SMS data. The base station may then send 1110 a ranging response message. The base station may include the mobile-terminated SMS data as a parameter in the ranging response message.

The method 1100 of FIG. 11 described above may be performed by various hardware and/or software component(s) and/or module(s) corresponding to the means-plus-function blocks 1200 illustrated in FIG. 12. In other words, blocks 1102 through 1110 illustrated in FIG. 11 correspond to means-plus-function blocks 1202 through 1210 illustrated in FIG. 12.

Reference is now made to FIG. 13. FIG. 13 illustrates an example showing another way that a mobile station 1304 may receive mobile-terminated SMS data 1338 in accordance with the present disclosure.

When a wireless communication network receives mobile-terminated SMS data 1338, the base station 1302 may send a broadcast page message (MOB_PAG-ADV) 1356 during a paging interval 1362. The broadcast page message 1356 may include the mobile-terminated SMS data 1338. In addition, the broadcast page message 1356 may include an identifier for the receiving mobile station 1304. For example, in WiMAX networks, the broadcast page message 1356 may include the 24-bit MAC address hash 1358 of the receiving mobile station 1304.

The broadcast page message 1356 may also include a command that is associated with the transmission of SMS data. For example, in WiMAX networks, the action code 1360 of the broadcast page message 1356 may be set to "no action." When the mobile station 1304 receives the broadcast page message 1356, if it determines that the value of the action code 1360 is set to "no action," and if the MAC address hash 1358 in the broadcast page message 1356 matches the MAC address of the mobile station 1304, then the mobile station 1304 may decode the mobile-terminated SMS data 1338 that is included in the broadcast page message 1356.

Figure 14:
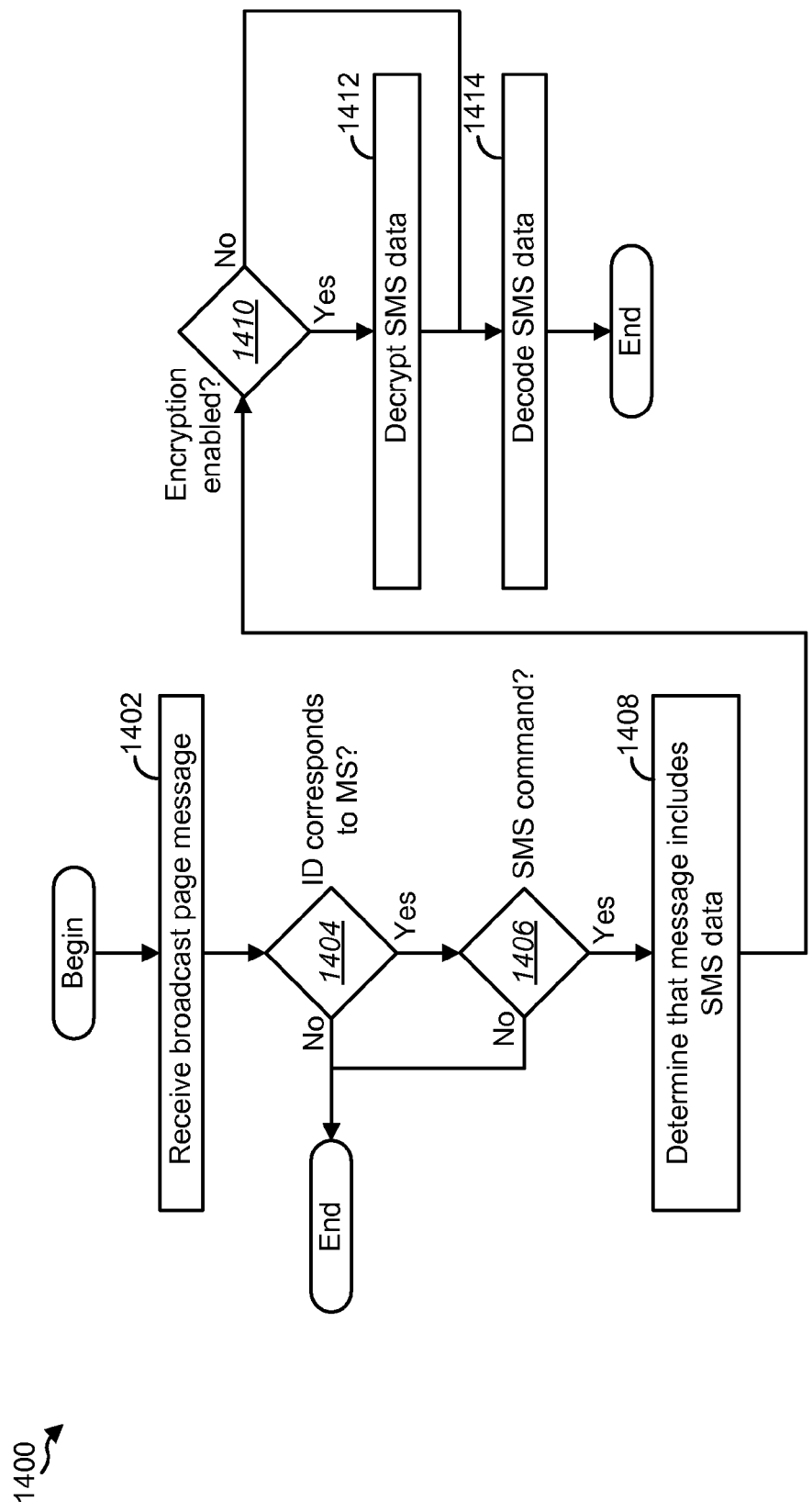
FIG. 14 illustrates an example of a method for receiving mobile-terminated SMS data in accordance with the present disclosure.

Reference is now made to FIG. 14. FIG. 14 illustrates an example of a method 1400 for receiving mobile-terminated SMS data in accordance with the present disclosure. The method 1400 may be implemented by a mobile station.

In accordance with the depicted method 1400, the mobile station may receive 1402 a broadcast page message during a paging interval. The mobile station may determine 1404 whether an identifier (e.g., a MAC address hash) in the broadcast page message corresponds to the mobile station. If it does, then the mobile station may determine 1406 whether the broadcast page message includes a command that is associated with the transmission of SMS data (e.g., whether the action code is set to "no command"). If so, then the mobile station may determine 1408 that the broadcast page message includes mobile-terminated SMS data that is intended for the mobile station.

The mobile station may determine 1410 whether SMS encryption is enabled. Whether SMS encryption is enabled may be decided during SBC negotiation procedures, as discussed above. If SMS encryption is enabled, then the mobile station may decrypt 1412 the mobile-terminated SMS data. The mobile station may also decode 1414 the mobile-terminated SMS data.

Figure 15:
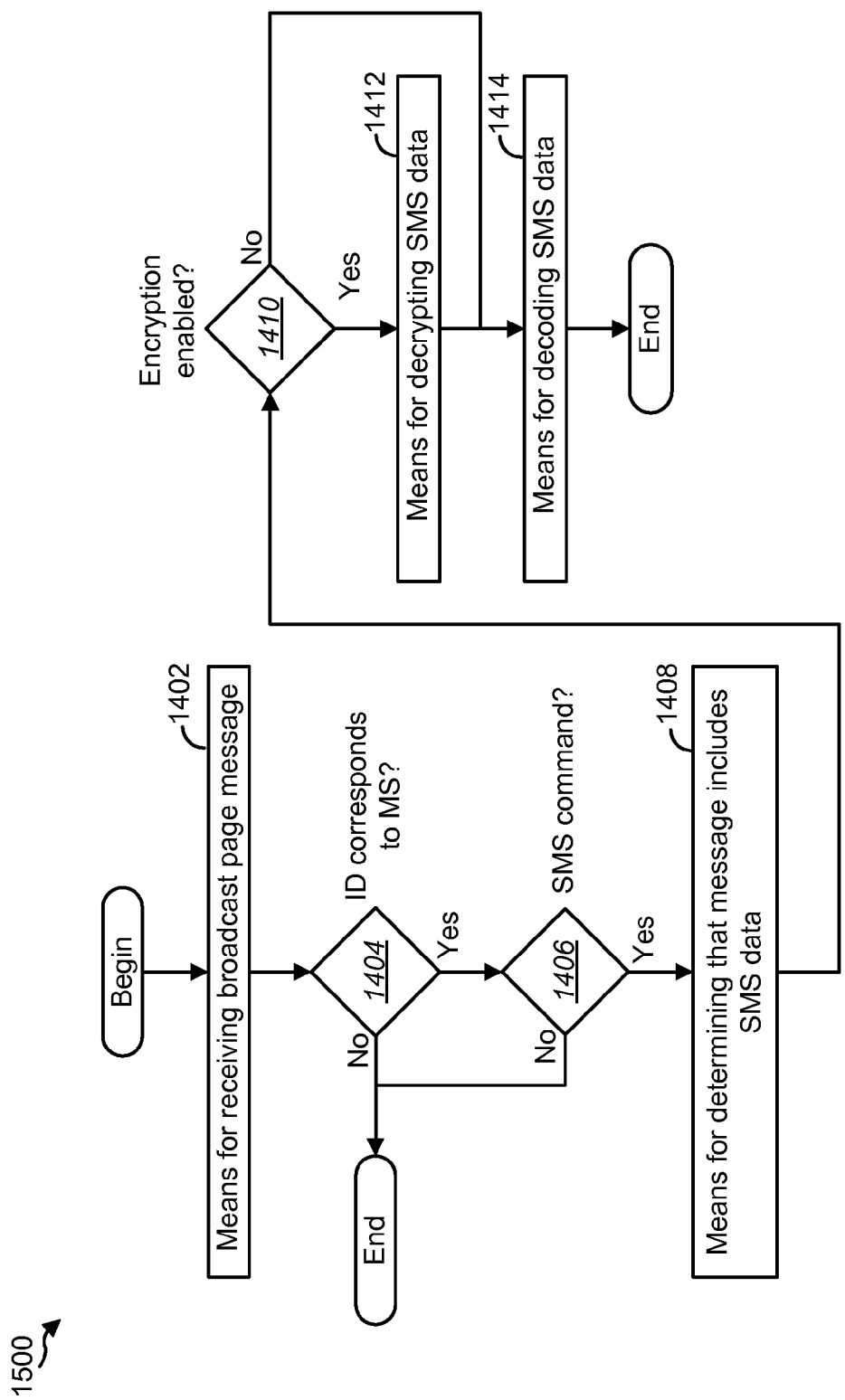
FIG. 15 illustrates means-plus-function blocks corresponding to the method of FIG. 14.

The method 1400 of FIG. 14 described above may be performed by various hardware and/or software component(s) and/or module(s) corresponding to the means-plus-function blocks 1500 illustrated in FIG. 15. In other words, blocks 1402 through 1414 illustrated in FIG. 14 correspond to means-plus-function blocks 1502 through 1514 illustrated in FIG. 15.

The methods for sending and receiving SMS data disclosed herein may provide several advantages relative to known approaches. For example, a mobile station may be permitted to send and receive SMS data while in idle mode, without setting up a traffic connection. Moreover, because WiMAX standards do not presently define SMS, the present disclosure provides a new service to WiMAX systems.

Reference is now made to FIG. 16. FIG. 16 illustrates certain components that may be included within a wireless device that is configured in accordance with the present disclosure. The wireless device 1664 may be a mobile station or a base station.

The wireless device 1664 includes a processor 1614. The processor 1614 may be a general purpose single- or multi-chip microprocessor (e.g., an ARM), a special purpose microprocessor (e.g., a digital signal processor (DSP)), a microcontroller, a programmable gate array, etc. The processor 1614 may be referred to as a central processing unit (CPU). Although just a single processor 1614 is shown in the wireless device 1664 of FIG. 16, in an alternative configuration, a combination of processors (e.g., an ARM and DSP) could be used.

The wireless device 1664 also includes memory 1628. The memory 1628 may be any electronic component capable of storing electronic information. The memory 1628 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1666 and instructions 1668 may be stored in the memory 1628. The instructions 1668 may be executable by the processor 1614 to implement the methods disclosed herein. Executing the instructions 1668 may involve the use of the data 1666 that is stored in the memory 1628.

The wireless device 1664 may also include a transmitter 1618 and a receiver 1622 to allow transmission and reception of signals between the wireless device 1664 and a remote location. The transmitter 1618 and receiver 1622 may be collectively referred to as a transceiver 1670. An antenna 1620 may be electrically coupled to the transceiver 1670. The wireless device 1664 may also include (not shown) multiple transmitters, multiple receivers, multiple transceivers and/or multiple antenna.

The various components of the wireless device 1664 may be coupled together by one or more buses, which may include a power bus, a control signal bus, a status signal bus, a data bus, etc. For the sake of clarity, the various buses are illustrated in FIG. 16 as a bus system 1672.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

As used herein, the term "component" refers to a computer-related entity. For example, the term "component" may refer to hardware, a combination of hardware and software, or software.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6, 9, 11 and 14, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for implementing Short Message Service (SMS) in a wireless communication network, the method being implemented by a mobile station, the method comprising:

sending mobile-originated SMS data while in idle mode, wherein ranging procedures are used to send the mobile-originated SMS data including sending a ranging request message that comprises the mobile-originated SMS data; and receiving mobile-terminated SMS data while in the idle mode, wherein receiving the mobile-terminated SMS data comprises receiving a broadcast page message from a base station, and wherein the broadcast page message comprises an identifier for the mobile station.

2. The method of claim 1, wherein receiving the mobile-terminated SMS data further comprises, in response to receiving the broadcast page message:

transmitting a ranging request message to the base station; and receiving a ranging response message from the base station, wherein the ranging response message comprises the mobile-terminated SMS data.

3. The method of claim 1, wherein the broadcast page message further comprises:

the mobile-terminated SMS data; and a command that is associated with transmission of SMS data.

4. The method of claim 1, further comprising:

negotiating with the base station about whether SMS data is to be encrypted; and if the SMS data is to be encrypted, negotiating with the base station about which encryption algorithm is to be used.

5. The method of claim 4, wherein the negotiating with the base station occurs in accordance with a Subscriber Basic Capability (SBC) negotiation procedure.

6. The method of claim 4, wherein if the SMS data is to be encrypted, a key used for encryption and decryption is a message authentication key that is specified in an Institute of Electronic and Electrical Engineers (IEEE) 802.16 standard.

7. A mobile station configured for implementing Short Message Service (SMS) in a wireless communication network, comprising:
a processor;
memory in electronic communication with the processor;
instructions stored in the memory, the instructions being executable by the processor to:
send mobile-originated SMS data while in idle mode, wherein ranging procedures are used to send the mobile-originated SMS data including sending a ranging request message that comprises the mobile-originated SMS data; and
receive mobile-terminated SMS data while in the idle mode, wherein receiving the mobile-terminated SMS data comprises receiving a broadcast page message from a base station, and wherein the broadcast page message comprises an identifier for the mobile station.

8. The mobile station of claim 7, wherein receiving the mobile-terminated SMS data further comprises, in response to receiving the broadcast page message:
transmitting a ranging request message to the base station; and
receiving a ranging response message from the base station, wherein the ranging response message comprises the mobile-terminated SMS data.

9. The mobile station of claim 7, wherein the broadcast page message further comprises:
the mobile-terminated SMS data; and
a command that is associated with transmission of SMS data.

10. The mobile station of claim 7, wherein the instructions are also executable to negotiate with the base station about whether SMS data is to be encrypted.

11. A mobile station configured for implementing Short Message Service (SMS) in a wireless communication network comprising:
means for sending mobile-originated SMS data while in idle mode, wherein ranging procedures are used to send the mobile-originated SMS data including sending a ranging request message that comprises the mobile-originated SMS data; and
means for receiving mobile-terminated SMS data while in the idle mode, wherein receiving the mobile-terminated SMS data comprises receiving a broadcast page message from a base station, and wherein the broadcast page message comprises an identifier for the mobile station.

12. The mobile station of claim 11, further comprising means for negotiating with the base station about whether SMS data is to be encrypted.

13. A non-transitory computer-readable medium comprising a computer-program product for a mobile station to implement Short Message Service (SMS) in a wireless communication network, the computer-program product having instructions thereon, the instructions comprising:
code for sending mobile-originated SMS data while in idle mode, wherein ranging procedures are used to send the mobile-originated SMS data including sending a ranging request message that comprises the mobile-originated SMS data; and
code for receiving mobile-terminated SMS data while in the idle mode, wherein receiving the mobile-terminated SMS data comprises receiving a broadcast page message from a base station, and wherein the broadcast page message comprises an identifier for the mobile station.

14. The non-transitory computer-readable medium of claim 13, the computer program product further comprising code for negotiating with the base station about whether SMS data is to be encrypted.

15. A method for implementing Short Message Service (SMS) in a wireless communication network, the method being implemented by a base station, the method comprising:
receiving mobile-originated SMS data from a mobile station while the mobile station is in idle mode, wherein ranging procedures are used to receive the mobile-originated SMS data included in a ranging request message; and
sending mobile-terminated SMS data to the mobile station while the mobile station is in the idle mode, wherein sending the mobile-terminated SMS data comprises sending a broadcast page message, and wherein the broadcast page message comprises an identifier for the mobile station.

16. The method of claim 15, wherein sending the mobile-terminated SMS data further comprises:
receiving a ranging request message from the mobile station; and
sending a ranging response message to the mobile station, wherein the ranging response message comprises the mobile-terminated SMS data.

17. The method of claim 15, wherein the broadcast page message further comprises:
the mobile-terminated SMS data; and
a command that is associated with transmission of SMS data.

18. The method of claim 15, further comprising:
negotiating with the mobile station about whether SMS data is to be encrypted; and
if the SMS data is to be encrypted, negotiating with the mobile station about which encryption algorithm is to be used.

19. The method of claim 18, wherein the negotiating with the mobile station occurs in accordance with a Subscriber Basic Capability (SBC) negotiation procedure.

20. The method of claim 18, wherein if the SMS data is to be encrypted, a key used for encryption and decryption is a message authentication key that is specified in an Institute of Electronic and Electrical Engineers (IEEE) 802.16 standard.

21. A base station configured for implementing Short Message Service (SMS) in a wireless communication network, comprising:
a processor;
memory in electronic communication with the processor;
instructions stored in the memory, the instructions being executable by the processor to:
receive mobile-originated SMS data from a mobile station while the mobile station is in idle mode, wherein ranging procedures are used to receive the mobile-originated SMS data included in a ranging request message; and
send mobile-terminated SMS data to the mobile station while the mobile station is in the idle mode, wherein sending the mobile-terminated SMS data comprises sending a broadcast page message, and wherein the broadcast page message comprises an identifier for the mobile station.

22. The base station of claim 21, wherein sending the mobile-terminated SMS data comprises:
receiving a ranging request message from the mobile station; and sending a ranging response message to the mobile station, wherein the ranging response message comprises the mobile-terminated SMS data.

23. The base station of claim 21, wherein the broadcast page message further comprises:
the mobile-terminated SMS data; and
a command that is associated with transmission of SMS data.

24. The base station of claim 21, wherein the instructions are also executable to negotiate with the mobile station about whether SMS data is to be encrypted.

25. A base station configured for implementing Short Message Service (SMS) in a wireless communication network, comprising:
means for receiving mobile-originated SMS data from a mobile station while the mobile station is in idle mode, wherein ranging procedures are used to receive the mobile-originated SMS data included in a ranging request message; and
means for sending mobile-terminated SMS data to the mobile station while the mobile station is in the idle mode, wherein sending the mobile-terminated SMS data comprises sending a broadcast page message, and wherein the broadcast page message comprises an identifier for the mobile station.

26. The base station of claim 25, further comprising means for negotiating with the mobile station about whether SMS data is to be encrypted.

27. A non-transitory computer-readable medium comprising a computer-program product for a base station to implement Short Message Service (SMS) in a wireless communication network, the computer-program product comprising a non transitory computer readable medium having instructions thereon, the instructions comprising:
code for receiving mobile-originated SMS data from a mobile station while the mobile station is in idle mode, wherein ranging procedures are used to receive the mobile-originated SMS data included in a ranging request message; and
code for sending mobile-terminated SMS data to the mobile station while the mobile station is in the idle mode, wherein sending the mobile-terminated SMS data comprises sending a broadcast page message, and wherein the broadcast page message comprises an identifier for the mobile station.

28. The non-transitory computer-readable medium of claim 27, the computer program product further comprising code for negotiating with the mobile station about whether SMS data is to be encrypted.

* * * * *